United States Patent [19]

Ross et al.

[11] 4,454,567
[45] Jun. 12, 1984

[54] ELECTROLYTIC CAPACITOR CONTAINING A MIXED SOLVENT SYSTEM

[75] Inventors: Sidney D. Ross, Williamstown; Manuel Finkelstein, North Adams, both of Mass.

[73] Assignee: Sprague Electric Company, North Adams, Mass.

[21] Appl. No.: 457,817

[22] Filed: Jan. 13, 1983

Related U.S. Application Data

[63] Continuation-in-part of Ser. No. 22,554, Mar. 21, 1979, abandoned.

[51] Int. Cl.³ .............................................. H01G 9/02
[52] U.S. Cl. .................................... 361/433; 252/62.2
[58] Field of Search ......................... 252/62.2; 361/433

[56] References Cited

U.S. PATENT DOCUMENTS

| | | | |
|---|---|---|---|
| 3,302,071 | 1/1967 | Stahr | 317/230 |
| 3,336,512 | 8/1967 | Stephenson | 317/230 |
| 3,351,823 | 11/1967 | Jenny | 317/230 |
| 3,454,840 | 7/1969 | Hagihara et al. | 317/230 |
| 3,487,270 | 12/1969 | Alwitt | 317/230 |
| 3,546,119 | 12/1970 | Chesnot | 252/62.2 |
| 3,646,403 | 2/1976 | Dunkl | 317/230 |
| 3,835,055 | 9/1974 | Chesnot | 252/62.2 |
| 4,107,761 | 8/1978 | Oyama | 361/433 |
| 4,373,176 | 2/1983 | Finkelstein | 252/62.2 |

FOREIGN PATENT DOCUMENTS

| | | |
|---|---|---|
| 694909 | 9/1964 | Canada . |
| 52-8501 | 9/1977 | Japan . |
| 1445894 | 8/1976 | United Kingdom . |

*Primary Examiner*—John F. Niebling

[57] ABSTRACT

An electrolytic capacitor contains an electrolyte solvent system in which one component is an acceptor in hydrogen bonding while the other component is one that can function both as acceptor and donor in hydrogen bonding. The solute or solutes present must not interact with either solvent component. When the above conditions are met, the result is an electrolyte whose resistivity curve passes through a minimum.

4 Claims, 6 Drawing Figures

ELECTROLYTIC CAPACITOR CONTAINING A MIXED SOLVENT SYSTEM

CROSS REFERENCE TO RELATED APPLICATION

This application is a continuation-in-part of application Ser. No. 022,554 filed Mar. 21, 1979 and now abandoned.

BACKGROUND OF THE INVENTION

This invention relates to an electrolytic capacitor containing an electrolyte in which the components of the solvent system are chosen from different hydrogen bonding categories. One component is an acceptor only, while the other component has both acceptor and donor functions in hydrogen bonding.

The first solvents for the electrolyte in electrolytic capacitors were water and ethylene glycol. These first solvents imposed severe restrictions on the temperature range over which the capacitor would operate and limited the electrical properties of the capacitor as well. Beginning in the nineteen-sixties, the non-aqueous solvents such as N,N′-dimethylformamide (DMF), γ-butyrolactone (BLO), N-methyl-2-pyrrolidinone (NMP), and dimethylsulfoxide (DMSO) began to be used in electrolytes for capacitors. These non-aqueous solvents greatly extended the temperature operating range of the electrolytic capacitor and improved its electrical properties.

The application requirements for the electrolytic capacitor have kept growing more and more stringent and more and more difficult to meet. Since the late sixties, there has grown up a continuous history of teachings in which a cosolvent is added to the major electrolyte solvent. The cosolvent is usually added to achieve some specific purpose. The following are examples from the patent literature of cosolvents which provide desired functions: (1) to lower the freezing point or elevate the boiling point and thereby increase the range of operating temperatures; (2) to either increase or decrease the viscosity of the electrolyte; (3) to improve the solubility of the electrolyte solute; (4) to improve some specific electrical property, e.g. to lower the leakage current, to raise the maximum formation voltage, or to raise the breakdown voltage.

The choices of cosolvents were made in purely Edisonian manner. There was no covering hypothesis or theory to guide the choice. Where success was achieved, it may be properly classified as an accidental showing, since it was guided neither by an understanding nor an elucidation of the role of the solvent or cosolvent in the electrolyte function.

Currently, the demands on the properties of electrolytic capacitors are becoming even more extreme. In particular, the need is to lower the ESRs and impedances of capacitors and to extend dramatically the high frequencies at which the capacitor will operate. To meet such requirements it is essential to lower the resistivity of the electrolyte drastically. This places a real premium on understanding the role of the electrolyte and developing a hypothesis and strategy that will permit minimization of the electrolyte resistivity.

The solvation and conduction processes are extremely complex. The solvent must first dissolve the salt solute and then ionize it to form the conducting species. Superimposed on these processes is a complex series of equilibria for the formation of ion aggregates that include ion pairs, ion triplets, ion quadruples, etc. In aqueous solution these equilibria play a minor role, but in nonaqueous solvents, where the polarities and dielectric constants are lower, these equilibria provide a dominating influence.

SUMMARY OF THE INVENTION

The purpose of this invention is to provide an electrolytic capacitor with an electrolyte solvent system having at least one property optimized by choosing solvents from different hydrogen bond formation functionality groups.

This invention is based on our hypothesis which relates solvent structure to solvent function, and which classifies solvents in accordance with both these structural features and their roles in the solvation, ionization, conduction phenomena. We present herewith experimental data to provide support for the validity of our hypothesis. Finally we show how following the teachings of this hypothesis permits selection of solvent systems for electrolytes so as to minimize the resistivities.

In the series of processes—solution, ionization, solvation, conduction—we start with neutral salt molecules, which dissolve, are solvated by the solvent, and finally ionized to form charged anions and cations, which then are the carriers of the current in the conduction process. Since the ionization forms both negatively charged or electron rich fragments and positively charged or electron poor fragments, the solvent must be capable of solvating and stabilizing fragments with two diametrically opposed electronic requirements.

Because hydrogen bonding plays a critical role in the above complex processes, it is convenient for the purposes of this invention to classify organic solvents according to their hydrogen bonding capabilities. Four distinct categories of solvents are identified and described in what follows:

Category I:

These are solvents which play no role in the hydrogen bonding process. They are neither electron donors nor electron acceptors and can function neither as hydrogen donors nor as hydrogen acceptors in the hydrogen bond formation process. Some typical examples are the aliphatic hydrocarbons, e.g. hexane and octane, and the aromatic hydrocarbons, e.g. benzene and toluene. These solvents play no role in electrolytes, since they are essentially insulators and have no ability to solubilize and ionize salts.

Category II:

These are solvents which can function only as hydrogen donors in hydrogen bonding. Methylene chloride ($CH_2Cl_2$) and chloroform ($CHCl_3$) are examples. The lone pairs on the chlorine atoms are essentially ineffective as acceptors, but the hydrogen atoms will function as donors in hydrogen bonding. These solvents show no evidence for association or aggregation to indicate intermolecular hydrogen bonding, but when mixed with a good electron donor solvent, e.g. a ketone, the observed exothermic heat of mixing indicates the formation of hydrogen bonds. No representative of this category is clearly useful in electrolyte solvents, and this category too is of no further concern to this invention.

Category III:

These are solvents can function only as acceptors in hydrogen bonding. These solvents are also classified as donor solvents, since they are good electron donors, or as aprotic solvents, since they do not ionize to provide a proton or participate in hydrogen bonding as a hydrogen donor. Examples of interest for capacitor electrolytes are the following:

1. Nitriles such as acetonitrile and 2-methoxypropionitrile.
2. N,N-disubstituted amides such as N,N-dimethylformamide, N,N-dimethylacetamide, and N-methyl-2-pyrrolidinone. The unsubstituted and monosubstituted amides, e.g. formamide and N-methylformamide, are not members of this category, since they can function in hydrogen bonding as hydrogen donors.
3. N,N,N',N'-tetrasubstituted ureas such as tetramethylurea. In this case, too, the lesser substituted members can function as hydrogen donors.
4. Lactones or cyclic esters such as γ-butyrolactone and propylene carbonate.
5. Some sulfur compounds, e.g. dimethylsulfoxide and sulfolane.
6. Nitrocompounds, e.g. nitrobenzene.
7. Cyclic urethanes, e.g. 3-ethyl-2-oxazolidone. Since these are all electron-rich molecules, they are especially effective in solvating cations, but their inability to provide a hydrogen for hydrogen bonding makes them unassociated, a desirable feature, but relatively ineffective in solvating anionic species.

Category IV:

These are solvents which function as both acceptors and donors in hydrogen bond formation. Water is the most common example. Its unusual properties—a relatively high boiling point and high viscosity despite a very low molecular weight—are attributable to this ability to form hydrogen bonds. The lone pairs on the oxygens can function as hydrogen acceptors, and, as a result, liquid water is highly associated, with dimers, trimers and other higher aggregates present.

The carboxylic acids, e.g. formic and acetic acid, also belong in this category. Hydrogen bonding can result in cyclic, dimeric structure (shown below),

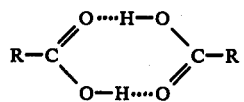

which has some stability even in the vapor phase.

Glycol, the most commonly used electrolyte solvent, falls within this group. Other electrolyte solvents of interest in this category are the cellosolves, e.g. methyl cellosolve, and the carbitols, e.g. methyl carbitol. Also of importance, as indicated above, are the N-unsubstituted and mono-N-substituted amides. Some additional examples of importance are N-methylpropionamide and 2-pyrrolidinone.

The donor and acceptor strengths are not equivalent in magnitude in this category of solvents. The donor capabilities parallel the acidities, with the more acidic solvents being the better donors. The acceptor strengths are proportional to the electron availability at the site that binds the hydrogen in the hydrogen bond. Since the electron density at a carbonyl oxygen is greater than at an alcohol oxygen, the carbonyl oxygen is a better acceptor for a hydrogen bond. Thus N-methylformamide, with a carbonyl oxygen available, is a much better acceptor than glycol, which has only alcohol oxygens.

In general these hydroxylic solvents are much more effective as proton donors than as proton acceptors. They are excellent for solvating anions but are frequently limited in their ability to solvate cations. This category of solvents is strong in donor capability and anion solvation but relatively weak in electron donation and hydrogen acceptor capability. In contrast, Category III solvents are strong in electron donor and hydrogen acceptor ability but incapable of providing the hydrogen donor function in the formation of a hydrogen bond.

It follows from the foregoing discussion that where cosolvents are to be used as electrolyte solvents that special benefits should accrue from mixing a Category III solvent with a Category IV solvent. We would except that such a mixture of solvents will provide better solubilization, more ionization, better solvation and stabilization, and greater conductivity from a mixture of solvents taken either from Category III alone or Category IV alone. In what follows, we propose to demonstrate that these expectations are in fact fulfilled and to provide a sequence of exploratory steps that will result in an electrolyte of minimum resistivity for a chosen set of solutes and solvents.

The above remarks do not apply where there is a chemical reaction of solute with solvent. The best known example of this is the reaction of borate with ethylene glycol. This reaction occurs not only with the simple borates such as boric acid, borax, biborate, ammonium pentaborate, etc., but also with the complex borates such as the boro-di-salicylates, etc.

Thus for the present invention, any solute used, even if more than one solute is used, must not interact or substantially not react with either component of the solvent system so there will be little change in the composition or the electrical properties of the electrolyte. The term non-interacting solute is used to denote such non-reacting or substantially non-reacting solutes and to exclude those that do react or interact to appreciable extent, specifically any borate solute, whether present as a sole solute or as part of a solute mixture.

DESCRIPTION OF THE PREFERRED EMBODIMENTS

Figure 1:
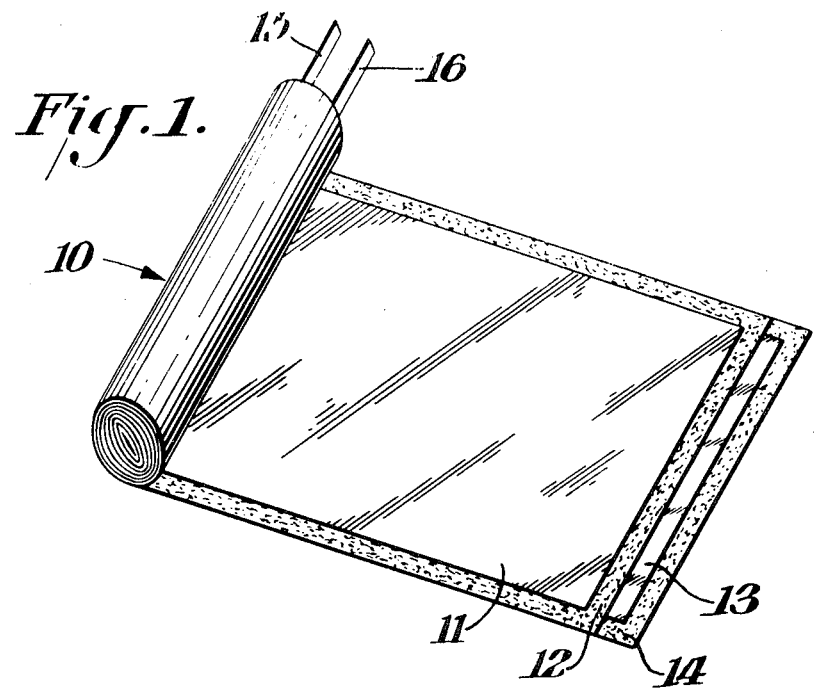
FIG. 1 shows a wound capacitor section partially unrolled.

Referring to FIG. 1, wound capacitor section 10 consists of anode foil 11 of a valve metal, preferably aluminum, having on its surface an insulating oxide barrier layer. Cathode foil 13 may also be a valve metal. Electrolyte absorbent films 12 and 14, preferably paper, are positioned between the anode and cathode foils. Tabs 15 and 16 are connected to electrodes 11 and 13 respectively to provide for connection of the electrodes to leads. When completely wound, section 10 is impregnated with electrolyte (not shown).

Figure 2:
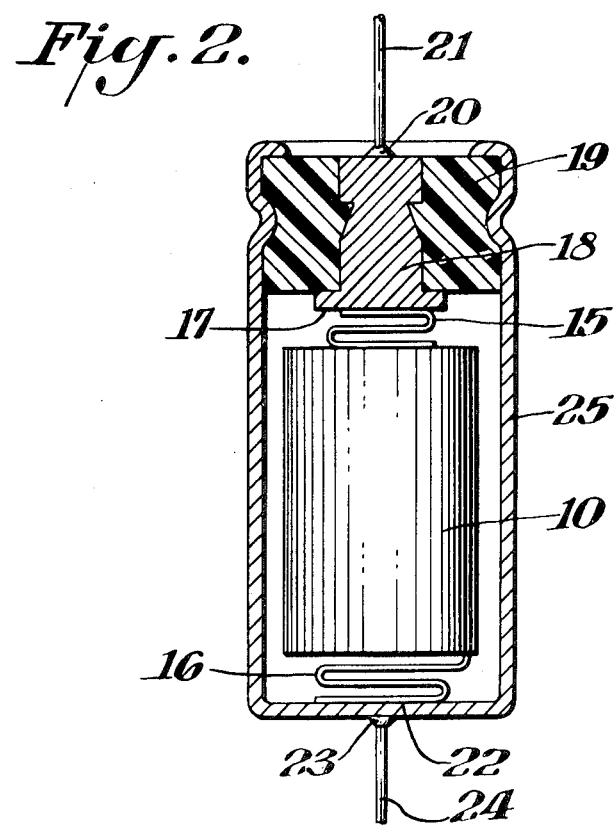
FIG. 2 is a cross-section of a capacitor containing a wound section.

FIG. 2 shows a cross-section of an axial capacitor in which the cathode tab 16 of capacitor section 10 is welded at 22 to the bottom of container 25 and it in turn is welded at 23 to cathode lead 24. Anode tab 15 is welded to the bottom portion 17 of plug 18 positioned in bushing 19 and welded at 20 to anode lead 21. Electrolyte (not shown) impregnates section 10.

Figure 3A:
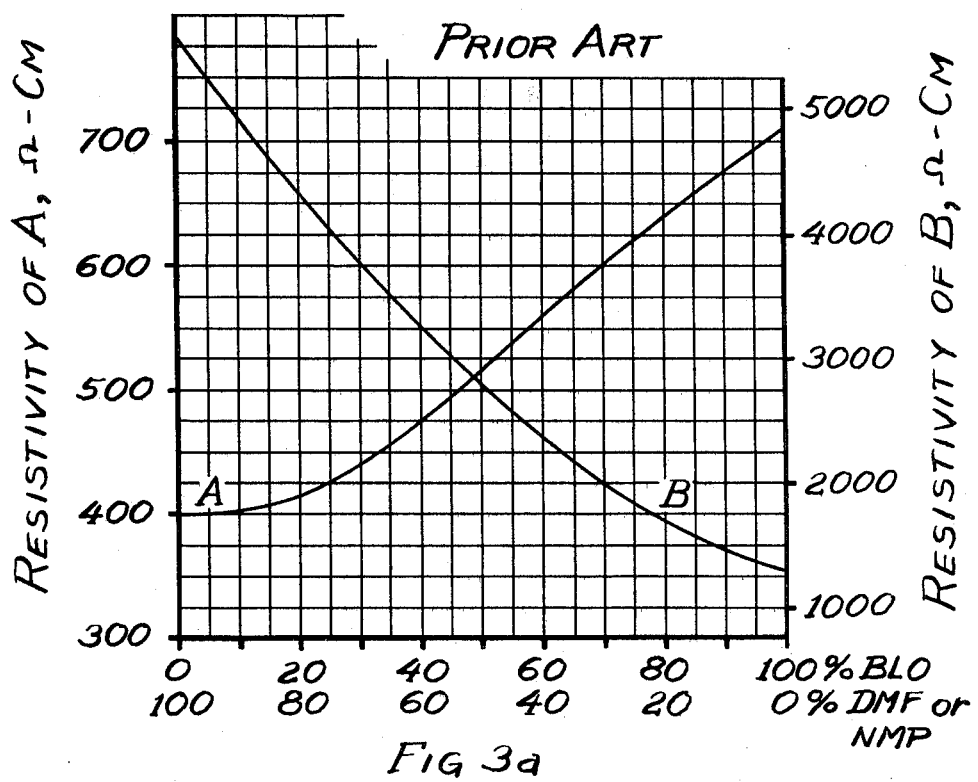
FIGS. 3a and 3b show resistivity curves for prior art electrolytes.
Figure 3B:
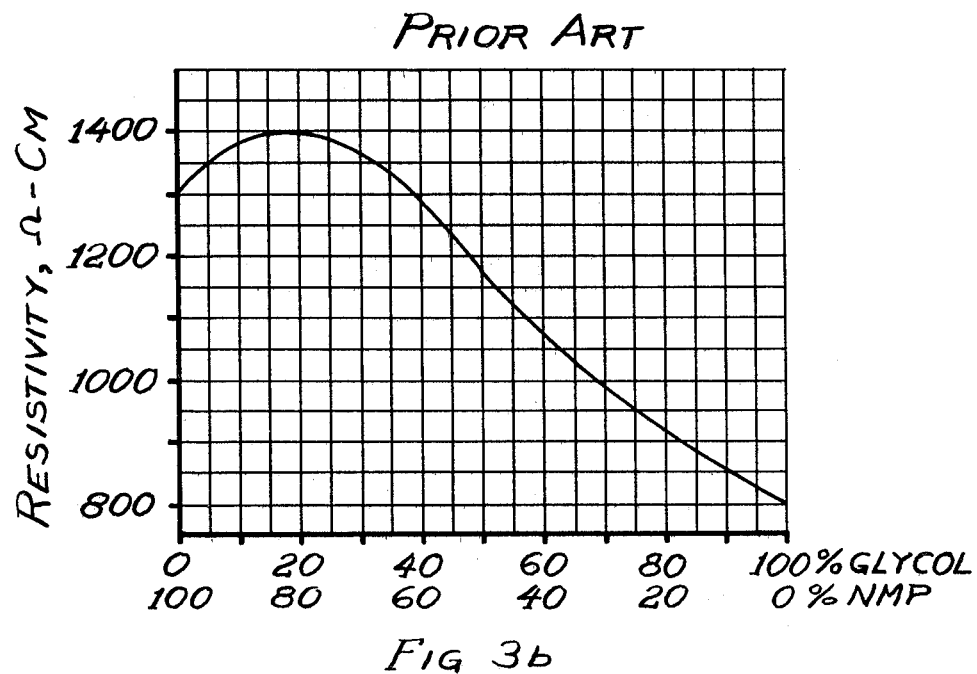

FIGS. 3a and 3b show resistivity curves for prior art electrolytes. FIG. 3a displays resistivity curves for two electrolytes in which the solute is noninteracting and the solvents are of the same hydrogen bond formation type. In electrolyte A, the solvents are butyrolactone (BLO) and DMF, and the solute is ammonium p-nitrobenzoate. In electrolyte B, the solvents are butyrolactone and N-methylpyrrolidinone (NMP), and the solute is N-ethylpiperidinium dodecanedioate. Both curves show a fairly direct relationship between solvent composition and resistivity.

FIG. 3b is a resistivity curve for an electrolyte in which the solvent components are from different categories, i.e. ethylene glycol and N-methylpyrrolidinone (NMP), but the solute is an interacting one, i.e., ammonium pentaborate. The curve shows a maximum reflecting an interaction with the formation of new species until some sort of an equilibrium is reached or all initial solute has been converted to new species.

Figure 4:
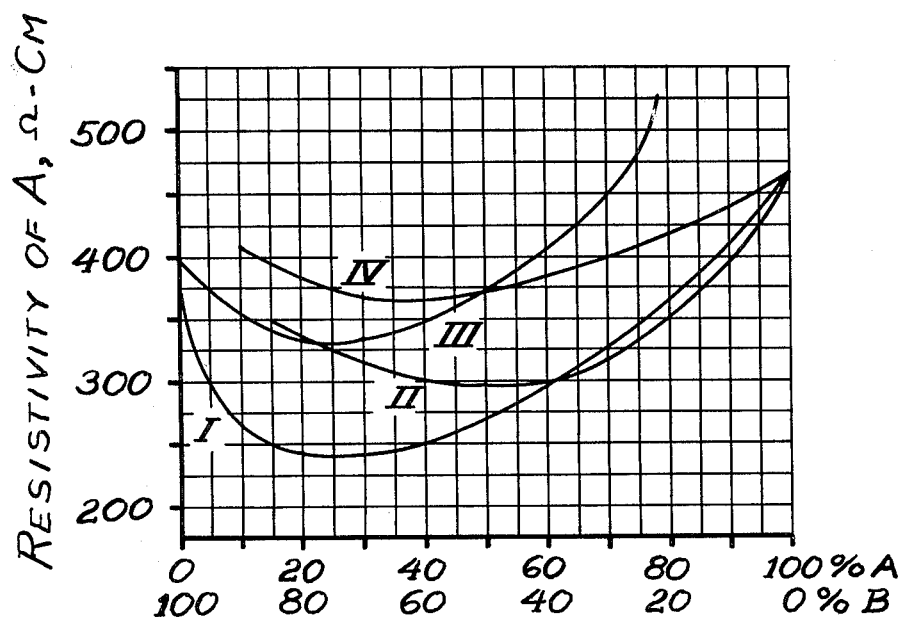
FIG. 4 is a series of resistivity curves for four sample electrolytes of the present invention.

FIG. 4 shows a striking feature of the present invention, namely a minimum in the resistivity curve when a non-interacting solute is used with a Category III and a Category IV solvent mixture. The same solute, ammonium p-nitrobenzoate, was used to show the effect of the solvent components. For electrolytes I, II, and IV, solvent component A is ethylene glycol; in electrolyte III, it is N-methyl propionamide. The second component, B, is DMF in electrolytes I and IV; butyrolactone in electrolyte II, and dimethylacetamide in electrolyte III. As can be seen, the minimum in the resistivity curve does not occur at the same solvent ratio even though the same solute was used in all four electrolytes in the same concentration.

resistivity minimum is shifted slightly with changing concentrations.

The invention may be used as follows. Depending on the requirements for the capacitor, one solvent and a solute are chosen. Factors which affect such choice include operating temperature and voltage rating as to whether the electrolyte is to be low-, intermediate-, or high-resistivity and whether high temperature stability is required for the solute.

Cosolvents from the other category are selected, and the resistivity curve for each solvent pair plus solute is determined as in FIG. 4. From these curves, the optimum cosolvent is selected.

Figure 5:
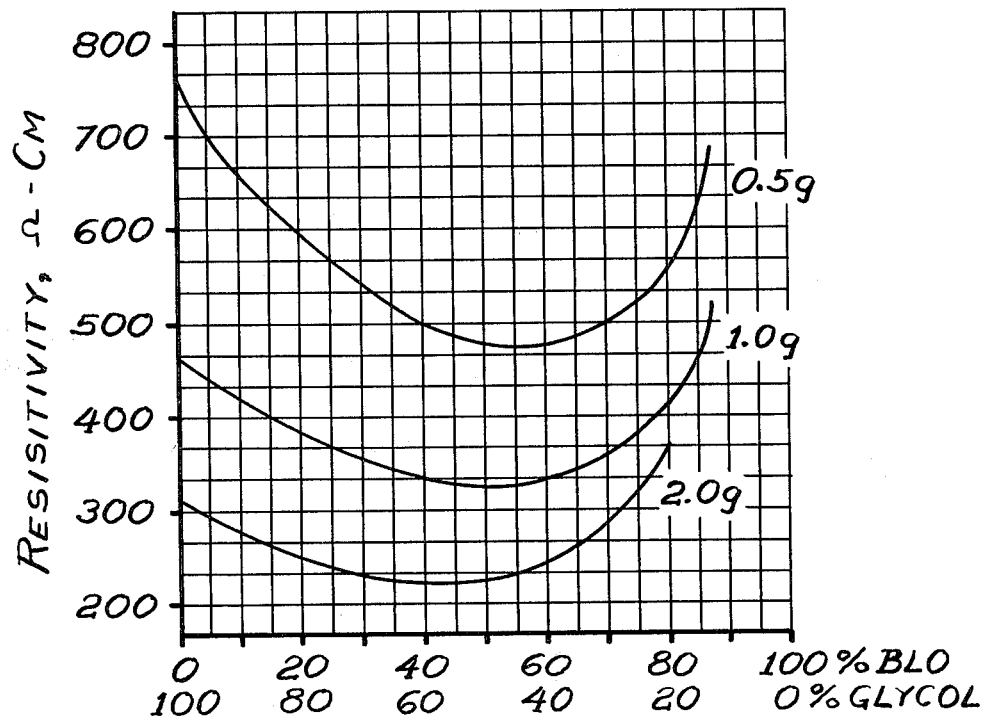
FIG. 5 is a series of resistivity curves for an electrolyte of the present invention in which solute concentration was varied.

Then, curves for various solute concentrations, as shown in FIG. 5, are prepared to determine the optimum electrolyte composition. Generally, as shown in FIG. 5, increasing solute concentration decreases resistivity.

Since these electrolytes are useful in aluminum electrolytic capacitors, some water must be present to assist in the reformation of barrier layer oxide during aging and capacitor life as is well-known. Generally, this water content varies between two and five weight percent.

In the tables below, resistivity data are presented for a series of electrolytes formulated according to the present invention.

EXAMPLE 1

The table below presents the data shown graphically in FIG. 4. The solvents used were ethylene glycol (GLY), dimethylformamide (DMF), dimethylacetamide (DMA), N-methylpyrrolidinone (NMP), and butyrolactone (BLO). In all cases, 1 g ammonium p-nitrobenzoate and 0.5 ml water in 10 ml of solvent mixture. Resistivities at 25° C. are given in ohm-cm, $\Omega$-cm, and solvent composition in percent by volume.

TABLE 1

| % GLY | % DMF | $\Omega$-cm | % GLY | % BLO | $\Omega$-cm | % GLY | % DMF | $\Omega$-cm | % NMP | % DMF | $\Omega$-cm |
|---|---|---|---|---|---|---|---|---|---|---|---|
| 0 | 100 | 383 | 100 | 0 | 461 | 100 | 0 | 454 | 0 | 100 | 399 |
| 10 | 90 | 262 | | | | | | | | | |
| 20 | 80 | 241 | 80 | 20 | 351 | 80 | 20 | 422 | 20 | 80 | 343 |
| 30 | 70 | 241 | | | | | | | | | |
| 40 | 60 | 243 | 60 | 40 | 297 | 60 | 40 | 383 | 40 | 60 | 342 |
| 50 | 50 | 262 | | | | 50 | 50 | 378 | 50 | 50 | 365 |
| 60 | 40 | 308 | 40 | 60 | 306 | 40 | 60 | 367 | 60 | 40 | 386 |
| 70 | 30 | 343 | | | | | | | | | |
| 80 | 20 | — | 20 | 80 | 350 | 20 | 80 | 382 | 80 | 20 | 520 |
| 90 | 10 | 408 | | | | 10 | 90 | 410 | | | |
| 100 | 0 | 461 | 0 | 100 | 707 | 0 | 100 | 672 | 100 | 0 | 737 |

In FIG. 5, the effect of solute concentration on the resistivity minimum is shown. The solvent system is ethylene glycol and butyrolactone (BLO), and the solute is ammonium o-nitrobenzoate in the amounts indicated. The basic shape of the resistivity curve remains the same with higher concentrations of solute giving lower resistivity electrolytes as would be expected. The

EXAMPLE 2

The table below presents the date shown graphically in FIG. 5. The solvent system was ethylene glycol-butyrolactone, and each electrolyte contains the amount of solute shown plus 0.4 ml water in 10 ml of solvent. The solute is ammonium p-nitrobenzoate, and resistivity is at 25° C. in ohm-cm.

TABLE 2

| Solute | % GLY | % BLO | $\Omega$-cm | Solute | % GLY | % BLO | $\Omega$-cm | Solute | % GLY | % BLO | $\Omega$-cm |
|---|---|---|---|---|---|---|---|---|---|---|---|
| 0.5 g | 100 | 0 | 768 | 1.0 g | 100 | 0 | 470 | 2.0 g | 100 | 0 | 313 |
| | 80 | 20 | 618 | | 80 | 20 | 380 | | 80 | 20 | 267 |
| | 60 | 40 | 513 | | 60 | 40 | 323 | | 70 | 30 | 244 |
| | 50 | 50 | 495 | | 50 | 50 | 314 | | 60 | 40 | 238 |
| | 40 | 60 | 476 | | 40 | 60 | 324 | | 50 | 50 | 238 |
| | 20 | 80 | 524 | | 20 | 80 | 386 | | 40 | 60 | 252 |
| | 10 | 90 | 651 | | 10 | 90 | 520 | | 30 | 70 | 286 |

TABLE 2-continued

| Solute | % GLY | % BLO | Ω-cm | Solute | % GLY | % BLO | Ω-cm | Solute | % GLY | % BLO | Ω-cm |
|---|---|---|---|---|---|---|---|---|---|---|---|
| | 0 | 100 | 1220 | | 0 | 100 | 978 | | 20 | 80 | 361 |

EXAMPLE 3

In this example, resistivity at 25° C. is given for a series of electrolytes using an ethylene glycolbutyrolactone solvent mixture. All show a resistivity minimum but not at the same place. For the solutes ammonium o-nitrobenzoate (AON), ammonium cyanoacetate (ACA) and ammonium phenylphosphinate (APP), two grams of solute plus 0.4 ml water were used in 10 ml solvent mixture; with ammonium metatungstate (AMT), five grams of solute plus 0.5 ml water were used in 10 ml of solvent mixture. With N-ethylpiperidinium dodecanedioate (EPDD), 0.003 mole of solute plus 0.5 ml water were used in 10 ml of solvent mixture, and with bis-diethylammonium fumarate (BDAF), one gram of solute plus 0.5 ml water were used in 10 ml of solvent mixture.

TABLE 3

| % GLY | % BLO | Resistivity, Ω-cm | | | | | |
|---|---|---|---|---|---|---|---|
| | | AON | AMT | ACA | APP | EPDD | BDAF |
| 100 | 0 | 313 | 457 | 159 | 302 | | 1265 |
| 90 | 10 | | | | | 752 | 600 |
| 80 | 20 | | 381 | | 279 | 673 | 430 |
| 70 | 30 | 286 | 356 | 129 | 270 | 645 | 380 |
| 60 | 40 | 238 | 322 | 136 | 280 | 695 | 365 |
| 50 | 50 | 238 | 330 | 145 | 291 | 759 | 349 |
| 40 | 60 | 252 | 325 | | | 878 | 365 |
| 33 | 67 | | | | 333 | | |
| 30 | 70 | 386 | 330 | 238 | | 1037 | 402 |
| 20 | 80 | 361 | 338 | | 499 | 1220 | 446 |
| 15 | 85 | | 356 | | | | |
| 10 | 90 | | 362 | | 840 | | 509 |
| 0 | 100 | Insol. | | | | 2085 | 590 |

EXAMPLE 4

In this example, DMF is used as one solvent with methyl cellosolve (MC), ethylene glycol, and 1,2-propanediol (PD), as the second component. The first three electrolytes contain 1 gm of ammonium p-nitrobenzoate and 0.5 ml of water in 10 ml of solvent mixture and the fourth contains 1 gm of bis-diethylammonium fumarate plus 0.5 ml of water in 10 ml of solvent mixture (last column).

TABLE 4

| % DMF | % PD | Ω-cm | % DMF | % GLY | Ω-cm | % DMF | % MC | Ω-cm | Ω-cm |
|---|---|---|---|---|---|---|---|---|---|
| 100 | 0 | 383 | 100 | 0 | 383 | 100 | 0 | 399 | Insol. |
| | | | 90 | 10 | 262 | | | | |
| | | | 80 | 20 | 241 | 80 | 20 | 327 | Insol. |
| 70 | 30 | 341 | 70 | 30 | 241 | | | | |
| | | | 60 | 40 | 262 | 60 | 40 | 301 | 514 |
| 50 | 50 | 458 | 50 | 50 | 256 | 50 | 50 | 297 | 495 |
| | | | 40 | 60 | 308 | 40 | 60 | 309 | 469 |
| 30 | 70 | 674 | 30 | 70 | 343 | | | | |
| | | | 10 | 90 | 408 | 20 | 80 | 311 | 457 |
| 0 | 100 | 1539 | 0 | 100 | 395 | 0 | 100 | 335 | 499 |

EXAMPLE 5

In this example, ethylene glycol is used as one solvent component with N-methylpyrrolidinone (NMP), 3-methoxypropionitrile (MPN), and dimethylsulfoxide (DMSO) as the second component. The solutes are 2 g ammonium anthranilate (AA) plus 0.5 ml water, 1 g diisopropylammonium formate (DIAF) plus 0.5 ml water, 0.003 mole of N-ethylpiperidinium dodecanedioate (EPDD) plus 0.5 ml water, and 0.5 g of ammonium p-nitrobenzoate (APN) plus 0.5 ml water, all in 10 ml of solvent mixture.

TABLE 5

| | | Resistivity, Ω-cm | | | | Ω-cm | | | Ω-cm |
|---|---|---|---|---|---|---|---|---|---|
| % GLY | % NMP | DIAF | EPDD | % GLY | % MPN | APN | % GLY | % DMSO | AA |
| 0 | 100 | 829 | 5586 | 0 | 100 | Insol. | 100 | 0 | 320 |
| 10 | 90 | | 2565 | | | | | | |
| 20 | 80 | 478 | 1653 | 20 | 80 | 579 | | | |
| 30 | 70 | | 1368 | | | | 70 | 30 | 310 |
| 40 | 60 | 438 | 1254 | 40 | 60 | 451 | 60 | 40 | 300 |
| 50 | 50 | 443 | 1277 | 50 | 50 | 443 | 50 | 50 | 304 |
| 60 | 40 | 450 | 1277 | 60 | 40 | 463 | 40 | 60 | 312 |
| 70 | 30 | | 1414 | | | | 30 | 70 | 352 |
| 80 | 20 | 464 | 1482 | 80 | 20 | 541 | | | |
| 90 | 10 | | 1562 | | | | | | |
| 100 | 0 | 486 | 2085 | 100 | 0 | 739 | 0 | 100 | 624 |

Other combinations that were evaluated include ethylene glycol with 3-ethyl-2-oxazolidone, methyl carbitol with butyrolactone, methyl carbitol with dimethysulfoxide, and methyl carbitol with 3-methoxypropionitrile, and various cellosolves with dimethylformamide, butyrolactone, and 3-methoxypropionitrile to provide a broad test matrix for evaluation of the prediction of optimized properties by combining two different classes of hydrogen bond formation functions.

What is claimed is:

1. An electrolytic capacitor comprising a plurality of spaced electrodes, at least one of which is coated with a barrier layer dielectric oxide, interleaved spacers, and an electrolyte in contact therewith, said electrolyte comprising a solute dissolved in a solvent system wherein at least one first component functions as both an acceptor and as a donor in hydrogen bond formation and at least one second component functions only as an acceptor in hydrogen bond formation, said electrolyte having a resistivity curve which passes through a minimum point, all solute present is characterized by being non-reacting with any solvent component, said electrolyte composition being adjusted to provide said minimum resistivity.

2. A capacitor according to claim 1 wherein said first solvent component is chosen from the group of carboxylic acids, hydroxylic solvents, alcohol ethers, N-unsubstituted amides, and mono-N-substituted amides.

3. A capacitor according to claim 2 wherein said first solvent component is chosen from the group of ethylene glycol, ethylene glycol monomethyl ether, diethylene glycol monomethyl ether, 1,2-propanediol, N-methylpropionamide and 2-pyrrolidinone.

4. A process for formulating an electrolytic capacitor comprising selecting a solute according to temperature, conductivity and voltage requirements, selecting a first solvent from the classes of those having both donor and acceptor functions in hydrogen bond formation and of those having acceptor function only, then according to final resistivity desired selecting a second solvent from the unchosen of said classes, all solute present being non-reactive with any solvent component, determining the resistivity curve, said electrolyte having a resistivity curve which passes through a minimum, and adjusting said electrolyte composition to provide said minimum resistivity.

* * * * *